United States Patent
Matsumoto et al.

(10) Patent No.: US 9,001,902 B2
(45) Date of Patent: Apr. 7, 2015

(54) TRANSMISSION SYSTEM

(71) Applicant: Fujitsu Limited, Kawasaki-shi, Kanagawa (JP)

(72) Inventors: Tadahisa Matsumoto, Kawasaki (JP); Hirotaka Tamura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 112 days.

(21) Appl. No.: 13/752,145

(22) Filed: Jan. 28, 2013

(65) Prior Publication Data

US 2013/0266055 A1    Oct. 10, 2013

(30) Foreign Application Priority Data

Apr. 9, 2012   (JP) ................. 2012-088371

(51) Int. Cl.
| | |
|---|---|
| *H04L 27/00* | (2006.01) |
| *H04L 25/06* | (2006.01) |
| *H04L 25/03* | (2006.01) |
| *H04L 25/02* | (2006.01) |

(52) U.S. Cl.
CPC .......... *H04L 25/06* (2013.01); *H04L 25/03006* (2013.01); *H04L 25/0272* (2013.01); *H04L 25/028* (2013.01)

(58) Field of Classification Search
USPC ........................................ 375/267
See application file for complete search history.

(56) References Cited

U.S. PATENT DOCUMENTS

| | | | |
|---|---|---|---|
| 6,014,410 A | 1/2000 | Ooishi | |
| 2008/0123792 A1* | 5/2008 | Prete et al. | 375/362 |
| 2009/0317078 A1* | 12/2009 | Uda et al. | 398/29 |

FOREIGN PATENT DOCUMENTS

| | | |
|---|---|---|
| JP | 10-224270 A | 8/1998 |
| JP | 2009-055306 A | 3/2009 |

* cited by examiner

*Primary Examiner* — Tanmay Shah
(74) *Attorney, Agent, or Firm* — Arent Fox LLP (57) ABSTRACT

A transmission system includes: a transmitter configured to transmit a first signal; a receiver configured to receiver a second signal from the transmitter; and a bias circuit configured to regulate a direct current bias level of an input terminal of the receiver, wherein the transmitter includes a first amplitude converter configured to convert the first signal to the second signal having a smaller amplitude than an amplitude of the first signal, wherein the receiver includes a second amplitude converter configured to convert the second signal to a third signal having a larger amplitude than the amplitude of the second signal, and wherein the first amplitude converter includes a first capacitance that restricts an amount of charge to be supplied to the receiver.

12 Claims, 14 Drawing Sheets

TRANSMISSION SYSTEM

CROSS-REFERENCE TO RELATED APPLICATION(S)

This application is based upon and claims the benefit of priority of the prior Japanese Patent Application No. 2012-088371, filed on Apr. 9, 2012, the entire contents of which are incorporated herein by reference.

FIELD

The embodiments discussed herein relate to transmission systems.

BACKGROUND

Although the element size of transistors is decreased in accordance with technology scaling such as Moore's Law, there has been no corresponding scaling of the local wiring delay inside semiconductor chips. Short gate length technology is used for high-speed operation inside semiconductor chips. Consequently, the proportion of the capacitance of wiring included in the output capacitance of a gate is increased and has a greater influence than the input capacitance of a subsequent gate. Power consumed by driving of wiring is increased and power efficiency at the time of data transmission is degraded.

Voltage mode complementary metal oxide semiconductor (CMOS) drivers and current driving current mode logic (CML) drivers are used in transmission systems employed inside semiconductor chips. For either type of driver, after deciding upon fan-out, which expresses a relationship between a driving power and a load, data transmission is performed via a plurality of repeaters.

The related art are disclosed in Japanese Laid-open Patent Publication No. H10-224270 and Japanese Laid-open Patent Publication No. 2009-55306.

SUMMARY

According to one aspect of the embodiments, a transmission system includes: a transmitter configured to transmit a first signal; a receiver configured to receiver a second signal from the transmitter; and a bias circuit configured to regulate a direct current bias level of an input terminal of the receiver, wherein the transmitter includes a first amplitude converter configured to convert the first signal to the second signal having a smaller amplitude than an amplitude of the first signal, wherein the receiver includes a second amplitude converter configured to convert the second signal to a third signal having a larger amplitude than the amplitude of the second signal, and wherein the first amplitude converter includes a first capacitance that restricts an amount of charge to be supplied to the receiver.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The power consumption of a CMOS driver is expressed using a data activation ratio, a load capacitance, a power supply voltage and a data rate. The power consumption of a CML driver is proportional to an amplitude, the load capacitance, the power supply voltage and the data rate. When the power consumption of a CMOS driver is substantially the same as the power consumption of a CML driver, the data activation ratio may become around 0.1, and the amplitude of the CML driver may become as small as 4.5% of the power supply voltage. When the data activation ratio is 0.1, electrical power used in charging and discharging of charge in the CML driver may be of the order of 4.5% of the total. A CML driver may not be power efficient as a data driver having a random characteristic. Consequently, a CMOS driver may be used to conserve power.

Figure 1:
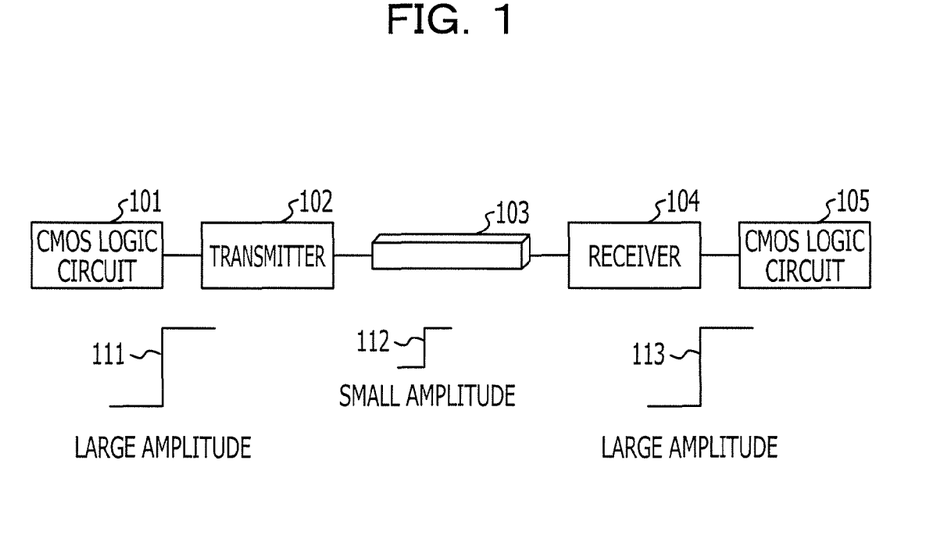
FIG. 1 illustrates an exemplary transmission system.

FIG. 1 illustrates an exemplary transmission system. This transmission system, for example, is provided inside the semiconductor chip of a semiconductor integrated circuit and data is transmitted at high speed. A CMOS logic circuit 101 outputs a binary data signal 111 to a transmitter 102. The data signal 111 may be a large amplitude signal. The transmitter 102 includes a first amplitude converter that converts the large amplitude data signal 111 into a small amplitude signal 112 and transmits the small amplitude signal 112 to a receiver 104 via a transmission channel 103. The amplitude of the large amplitude signal 111 may be for example 0.85 V and the amplitude of the small amplitude signal 112 may be for example 200 mV. The small amplitude signal 112 may have a smaller amplitude than the large amplitude signal 111. The first amplitude converter transmits the small amplitude signal 112, which was generated by making the amplitude of the large amplitude signal 111 smaller. The receiver 104 receives the small amplitude signal 112 transmitted by the transmitter 102 via the transmission channel 103. The receiver 104 includes a second amplitude converter that converts the small amplitude data signal 112 into a large amplitude signal 113 and outputs the large amplitude signal 113 to a CMOS logic circuit 105. The second amplitude converter outputs the large amplitude signal 113, which was generated by making the amplitude of the small amplitude signal 112 transmitted by the transmitter 102 larger. The amplitude of the large amplitude signal 113 may be for example 0.85 V and the amplitude of the small amplitude signal 112 may be for example 200 mV. The large amplitude signal 113 has a larger amplitude than the small amplitude signal 112. The transmitter 102 transmits the small amplitude signal 112 to the receiver 104 through the transmission channel 103, and as a result power consumption may be reduced.

Figure 2:
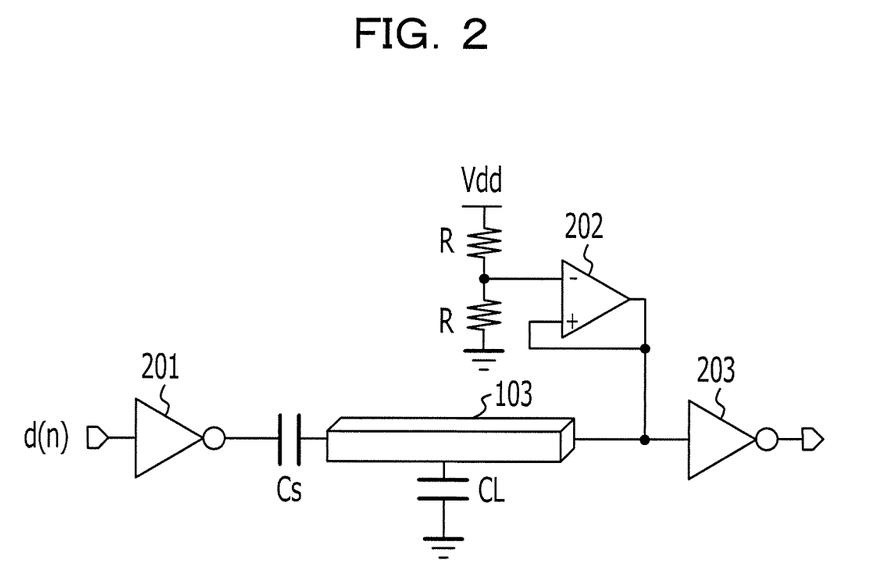
FIG. 2 illustrates an exemplary circuit of a transmission system.

FIG. 2 illustrates an exemplary circuit of a transmission system. The transmission system includes a transmitter 102 having a CMOS inverter (driver) 201 and a capacitance Cs, a transmission channel 103 having a capacitance CL, and a receiver 104 (FIG. 1) having an inverter 203 and a bias circuit. For example, the transmitter 102 may be the transmitter 102 illustrated in FIG. 1 and the receiver 104 may be the receiver 104 illustrated in FIG. 1. The bias circuit includes an operational amplifier 202 and two resistances R. The capacitance CL represents the sum of the capacitance of the transmission channel 103 and the input capacitance of the receiver 104. An input data signal d(n), for example, may correspond to the large amplitude signal 111 illustrated in FIG. 1. The inverter 201 inversely amplifies the input data signal d(n) and outputs the inversely-amplified input data signal. The first capacitance Cs may be a coupling capacitance coupling an output terminal of the inverter 201 and the transmission channel 103. The amount of charge injected into the capacitance CL is restricted by the first capacitance Cs and therefore, for example, the large amplitude signal 111 illustrated in FIG. 1 is amplitude converted into the small amplitude signal 112. The first capacitance Cs restricts the amount of charge supplied to the receiver 104. Due to the capacitive division of the capacitances Cs and CL, the voltage of the input signal 112 of the receiver 104 may be lower than the voltage of the input signal 111 of the transmitter 102. As a result of the capacitive coupling between the capacitances Cs and CL, the input signal 112 of the receiver 104 has a frequency characteristic from which a direct current bias level signal has been lost and therefore the frequency characteristic on the receiver 104 side may be compensated for this loss. The bias circuit including the resistances R and the operational amplifier 202 may receive and supply a direct current component to the input terminal of the receiver 104. For example, the bias circuit may regulate the direct current bias level of the input terminal of the receiver 104. The inverter 203 of the receiver 104 amplitude converts the small amplitude signal 112 to a logic level appropriate for a CMOS logic circuit 105 and outputs the large amplitude signal 113 to the CMOS logic circuit 105. The transmitter 102 transmits the small amplitude signal 112 through the transmission channel 103 to the receiver 104, and as a result power consumption may be reduced.

Figure 3:
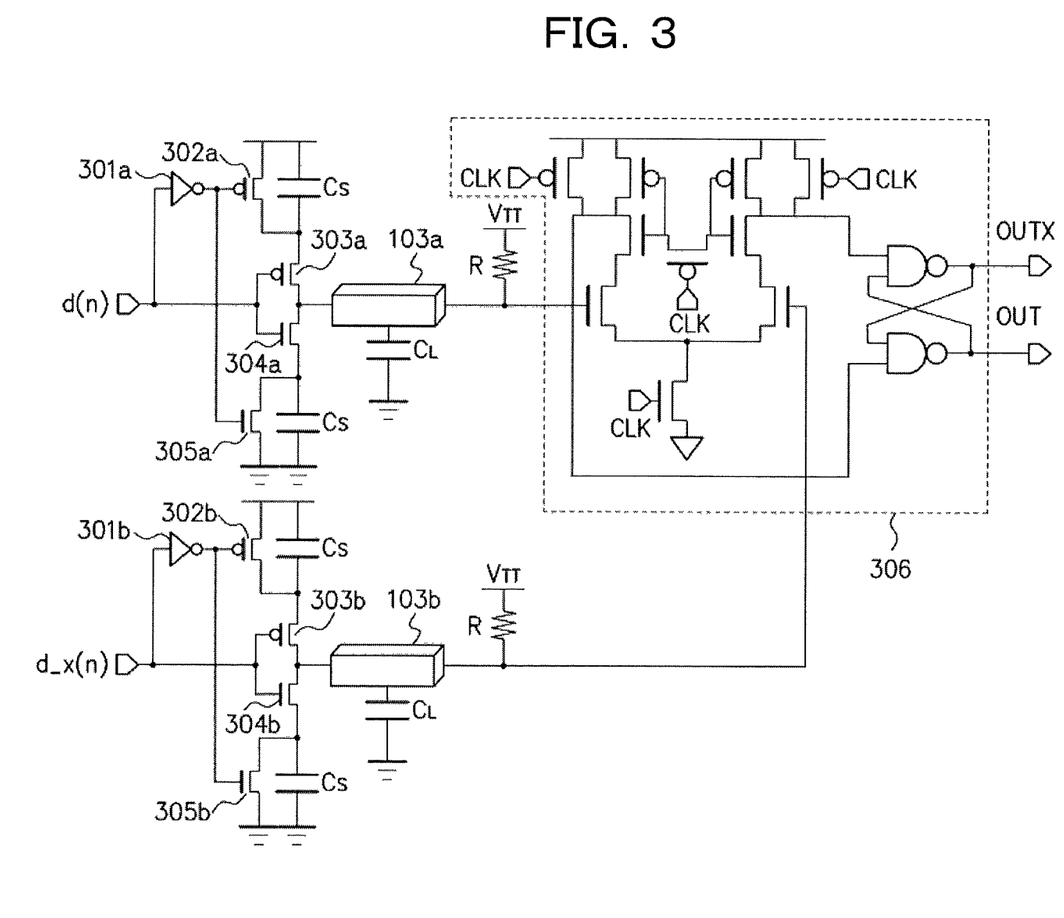
FIG. 3 illustrates an exemplary circuit of a transmission system.

FIG. 3 illustrates an exemplary circuit of a transmission system. A transmitter 102 includes inverters 301a and 301b, p-channel field effect transistors 302a, 303a, 302b and 303b, n-channel field effect transistors 304a, 305a, 304b and 305b and a plurality of first capacitances Cs. The transmitter 102 converts large amplitude differential input data signals d(n) and d_x(n) into small amplitude differential data signals and transmits the signals to the receiver 104 through transmission channels 103a and 103b. The transmission channels 103a and 103b may correspond to the transmission channel 103 illustrated in FIG. 1. A receiver 104 includes a bias circuit having resistances R and a strong arm latch circuit 306.

First capacitances Cs are coupled between output terminals of the transmitter 102 and direct current potential nodes, for example, a power supply potential node or a ground potential node. Charge injected into the load capacitances CL is restricted by the driver capacitances Cs and is output to the transmission channels 103a and 103b. The strong arm latch circuit 306 may serve as a second amplitude converter that converts small amplitude differential data signals input via the transmission channels 103a and 103b into large amplitude differential data signals OUT and OUTX. Discrete time processing may be performed via control with a clock signal CLK. Other components and functions in FIG. 3 may be substantially the same as or similar to those illustrated in FIG. 2.

Figure 4:
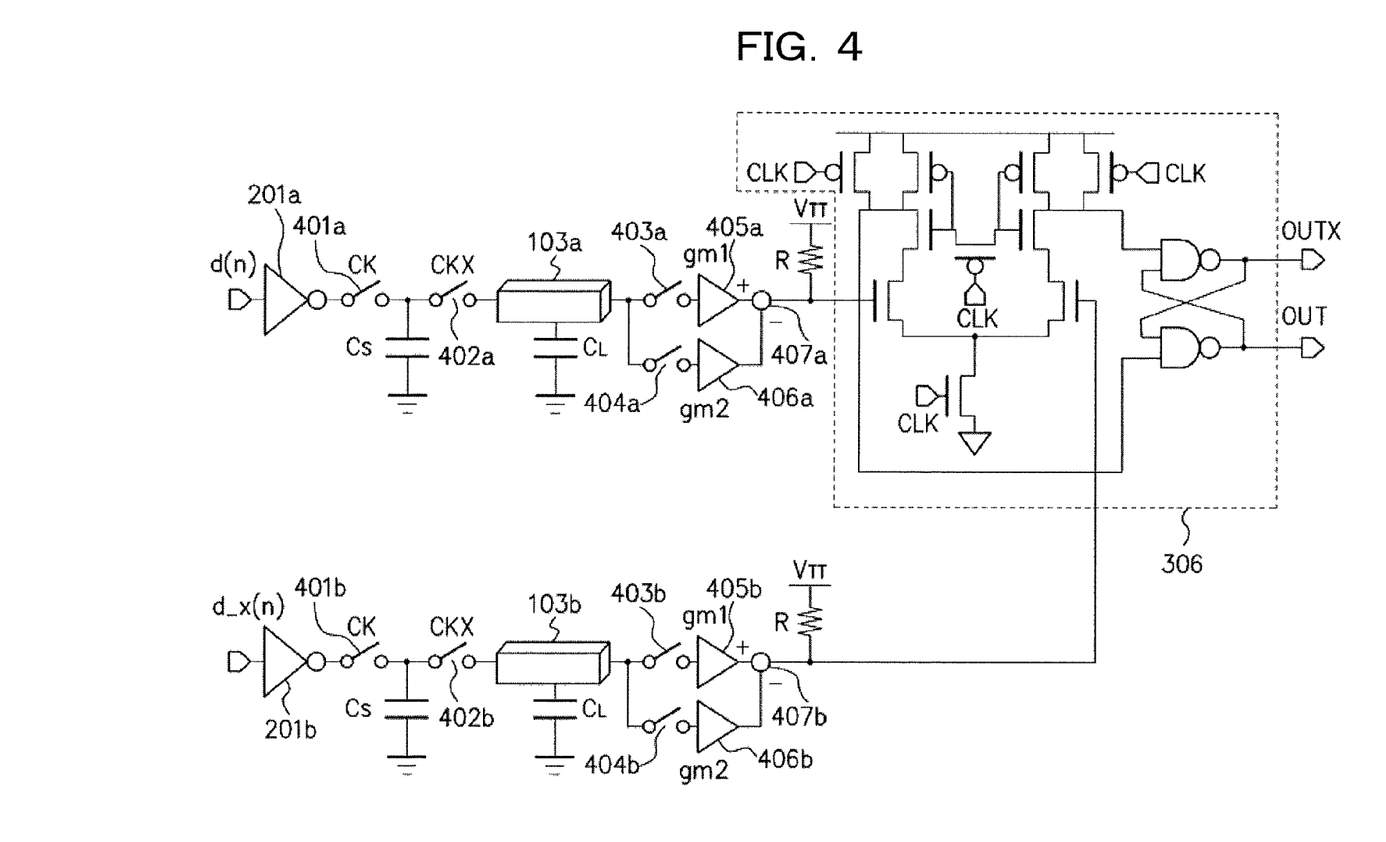
FIG. 4 illustrates an exemplary circuit of a transmission system.
Figure 5:
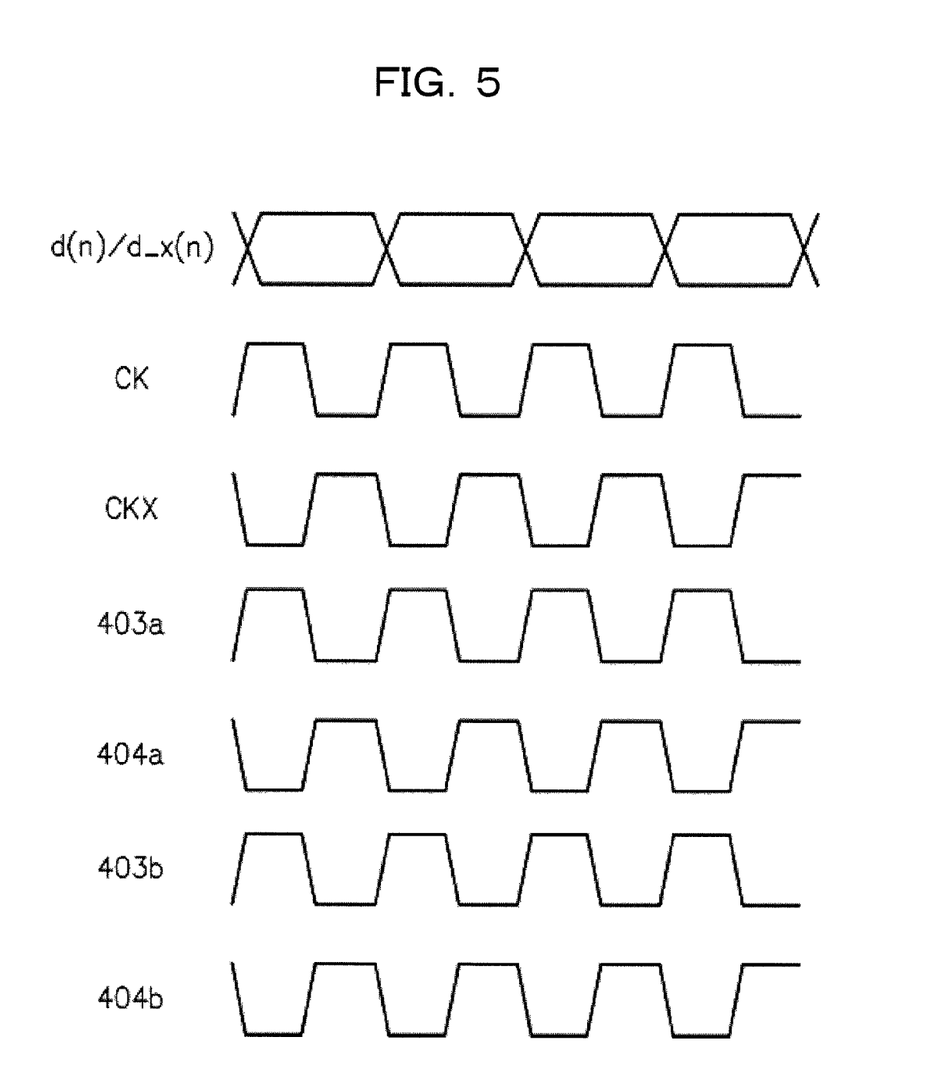
FIG. 5 illustrates an exemplary operation of a transmission system.

FIG. 4 illustrates an exemplary circuit of a transmission system. FIG. 5 illustrates an exemplary operation of a transmission system. The transmission system illustrated in FIG. 4 may perform the operation illustrated in FIG. 5. A transmitter 102 includes inverters 201a and 201b, switches 401a, 402a, 401b and 402b and capacitances Cs. A receiver 104 includes switches 403a, 404a, 403b and 404b, multipliers 405a, 406a, 405b and 406b, subtracters 407a and 407b, resistances R and a strong arm latch circuit 306. As illustrated in FIG. 5, the switches 403a and 403b may operate at a timing substantially the same as a clock signal CK. The switches 404a and 404b may operate at a timing substantially the same as a clock signal CKX.

When the clock signal CK changes to a high level and the clock signal CKX changes to a low level, the switches 401a and 401b are turned on, the switches 402a and 402b are turned off and capacitances Cs are charged. After that, when the clock signal CK changes to a low level and the clock signal CKX changes to a high level, the switches 401a and 401b are turned off and the switches 402a and 402b are turned on, and the capacitances Cs are coupled to transmission channels 103a and 103b.

First capacitances Cs are coupled between output terminals of the transmitter 102 and a direct current node, for example, a ground potential node. Charge injected into the load capacitances CL is restricted by the capacitances Cs and is output to the transmission channels 103a and 103b. Other components and functions in FIG. 4 and FIG. 5 may be substantially the same as or similar to those illustrated in FIG. 2 or FIG. 3.

Figure 6:
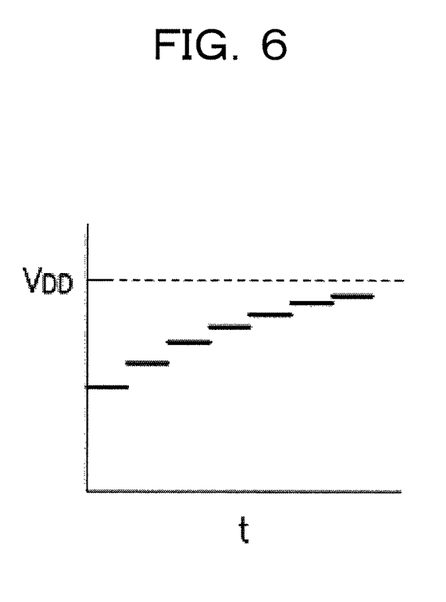
FIG. 6 illustrates an exemplary output voltage.

FIG. 6 illustrates an exemplary output voltage. The output voltage illustrated in FIG. 6 may be the output voltage of the transmitter 102 illustrated in FIG. 1, 2, 3 or 4. In FIG. 6, when data of "1" is continuously transmitted, the output voltage of the transmitter 102 gradually approaches the power supply potential VDD and becomes saturated at the power supply potential VDD due to intersymbol interference (ISI). When data of "0" is continuously transmitted, the output voltage of the transmitter 102 gradually approaches the ground potential and becomes saturated at the ground potential.

The output voltage Vout (n+1) of the transmitter 102 is represented by the following equation (1). The output voltage Vout may receive intersymbol interference from the previous output voltage Vout (n).

$$V_{out}(n+1) = \frac{C_L}{C_L + C_S} V_{out}(n) + \frac{C_S}{C_L + C_S} d(n+1) \tag{1}$$

The intersymbol interference may be removed using a first order equalizer, as represented by the following equation (2).

$$\frac{C_S}{C_L + C_S} d(n+1) = V_{out}(n+1) - \frac{C_L}{C_L + C_S} V(n) \quad (2)$$

The multipliers 405a, 406a, 405b and 406b and the subtracters 407a and 407b may correspond to a discrete time equalizer that flatten frequency characteristic generated in signal transmission from the transmitter 102 to the receiver 104. The multipliers 405a and 405b multiply an input signal by a coefficient gm1 and output the resulting signal. The multipliers 406a and 406b multiply an input signal by a coefficient gm2 and output the resulting signal. The value of "CL/(CL+Cs)" of the above equation (2) may include the coefficients gm1 and gm2. The intersymbol interference included in input data signals of the receiver 104 is removed by the equalizers and saturation of the data signal toward the power supply potential VDD or ground potential is reduced. When intersymbol interference is generated in many bits, reception may be performed by adjusting the number of taps of the equalizers and the values of the coefficients gm1 and gm2. The equalizers remove intersymbol interference caused by transmission from the transmitter 102 to the receiver 104. The strong arm latch circuit 306 may correspond to a second amplitude converter that converts small amplitude differential data signals input via the transmission channels 103a and 103b into large amplitude differential data signals OUT and OUTX. Discrete time processing may be performed under the control with the clock signal CLK.

Figure 7:
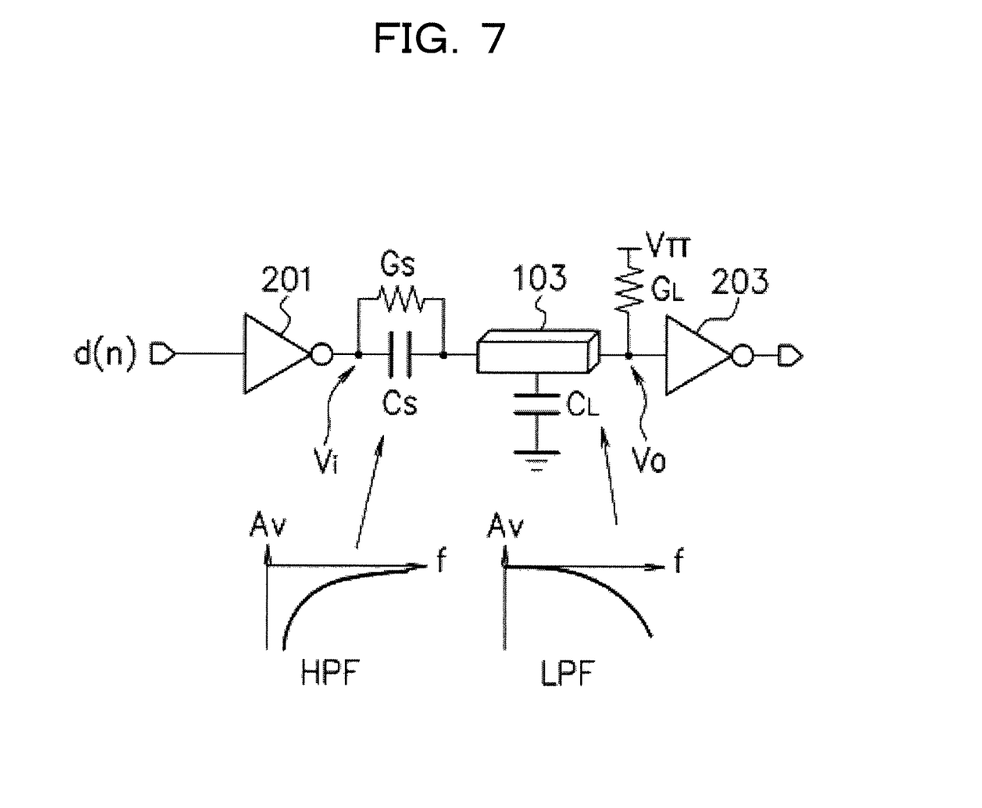
FIG. 7 illustrates an exemplary circuit of a transmission system.

FIG. 7 illustrates an exemplary circuit of a transmission system. A transmitter 102 includes an inverter 201, a first resistance of conductance Gs and a first capacitance Cs. A receiver 104 includes a second resistance of conductance GL and an inverter 203. The first resistance of the conductance Gs and the second resistance of the conductance GL may correspond to a bias circuit and may regulate the direct current bias level of an input terminal of the inverter 203. The first resistance of the conductance Gs is coupled in parallel with the first capacitance Cs. The second resistance of the conductance GL is coupled between the input terminal of the receiver 104 and a power supply potential node VTT. The first capacitance Cs is coupled between the output terminal of the inverter 201 and a transmission channel 103. A voltage Vi may be an output voltage of the inverter 201. A voltage Vo may be an input voltage of the inverter 203. A transfer function H(s) of the transmission channel 103 is expressed by the following equation (3).

$$H(s) = \frac{Vo(s)}{Vi(s)} \quad (3)$$

$$= \frac{\frac{G_L}{G_S + sC_S}}{\frac{G_S}{G_L + sC_L} + \frac{G_S}{G_S + sC_S}}$$

The condition that the frequency characteristic of the transfer function H(s) is flat, for example, uniform, may be Cs:CL=Gs:GL. When resistance RL=1/GL and resistance Rs=1/Gs, the transfer function H(s)=RL/(Rs+RL). Independent of frequency, the frequency characteristic is flat, for example, uniform.

The capacitance CL is expressed as the sum of the capacitance of the transmission channel 103 and the input capacitance of the receiver 104. The direct current potential node VTT is coupled to the first resistance of the conductance Gs via the transmission channel 103. An alternating current component is supplied to the transmission channel 103 by the first capacitance Cs. A direct current component is supplied to the transmission channel 103 by the first resistance of the conductance Gs. By setting a ratio of capacitance to conductance to Cs:CL=Gs:GL, the frequency characteristic generated in transmission from the transmitter 102 to the receiver 104 may be flattened and the occurrence of errors due to intersymbol interference generated at the time of high-speed signal transmission may be reduced. Other components and functions in FIG. 7 may be substantially the same as or similar to those illustrated in FIG. 2.

Figure 8A:
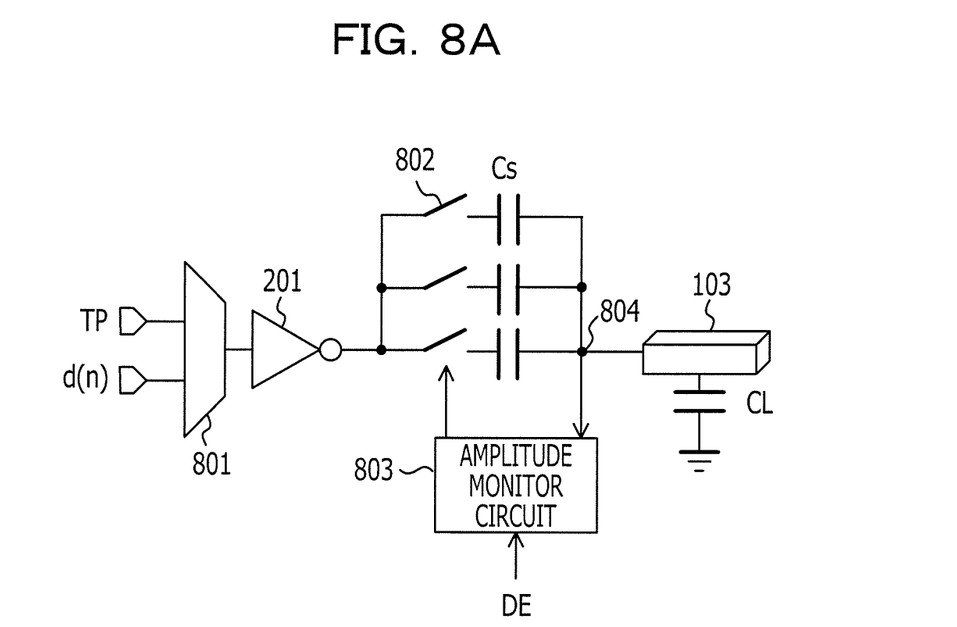
FIG. 8A and FIG. 8B illustrate an exemplary circuit of a transmission system and a signal.
Figure 8B:
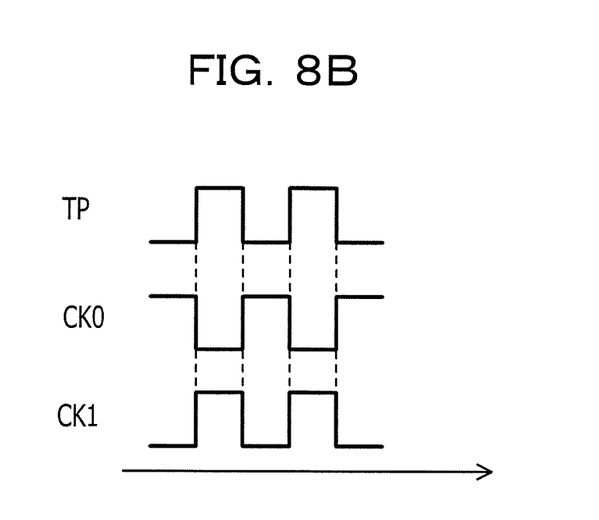

FIG. 8A and FIG. 8B illustrate an exemplary circuit of a transmission system and a signal. A transmitter 102 includes a selector circuit 801, an inverter 201, switches 802, capacitances Cs and an amplitude monitor circuit 803. For example, one or multiple series circuits, in which a switch 802 and a capacitance Cs are coupled in series, may be coupled in parallel between the output terminal of the inverter 201 and a transmission channel 103. The selector circuit 801 selects a test pattern TP in a test mode or selects an input data signal d(n) in a normal mode, and then outputs the test pattern TP or the input data signal d(n).

In initialization processing immediately after power on, the selector circuit 801 selects and outputs a test pattern TP in a test mode. The test pattern TP, for example, may be a pattern in which a data signal of "1" and a data signal of "0" are alternately generated such as "101010". The amplitude monitor circuit 803 controls the switches 802 in the initial period. The amplitude monitor circuit 803 detects the amplitude of a voltage of an output terminal 804 of the transmitter 102 and controls the switches 802 so that the detected amplitude of the voltage becomes an expected value DE. The values of the capacitances Cs between the output terminal of the inverter 201 and the transmission channel 103 may be changed under a control of the switches 802. Accordingly, the amplitude of the voltage of the output terminal 804 of the transmitter 102 may change. The amplitude monitor circuit 803 detects the amplitude of the output voltage of the transmitter 102 and controls the values of the first capacitances Cs in accordance with the detected amplitude of the output voltage. Consequently, the amplitude of the output voltage of the transmitter 102 may be set to a desired expected value DE. Next, the connection states of the switches 802 are fixed and the selector circuit 801 selects and outputs an input data signal d(n). The transmission system transmits the input data signal d(n).

Figure 9:
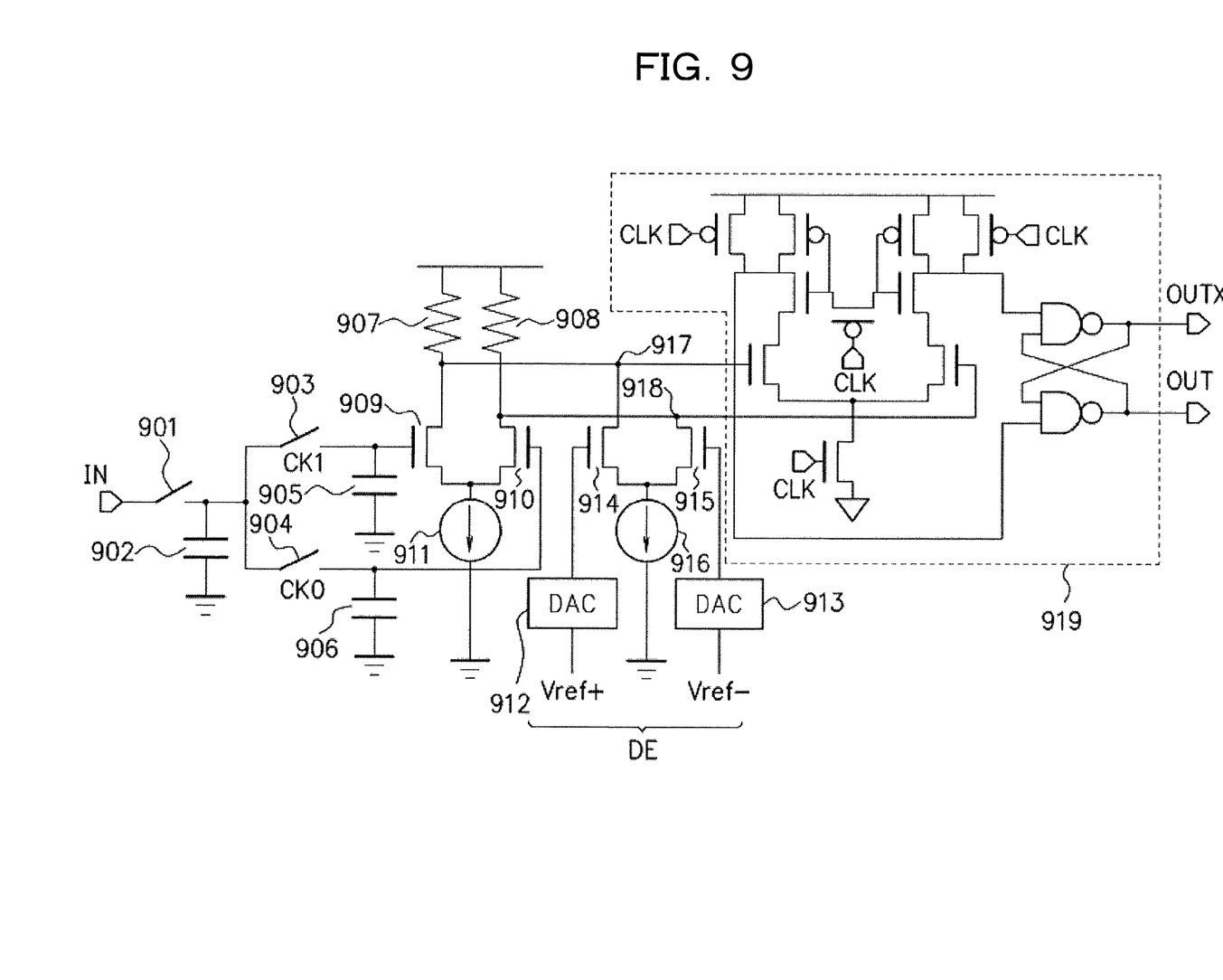
FIG. 9 illustrates an exemplary amplitude monitor circuit.

FIG. 9 illustrates an exemplary amplitude monitor circuit. The amplitude monitor circuit illustrated in FIG. 9 may be the amplitude monitor circuit 803 illustrated in FIG. 8A. The amplitude monitor circuit 803 includes switches 901, 903 and 904, capacitances 902, 905 and 906, resistances 907 and 908, n-channel field effect transistors 909, 910, 914 and 915, current supplies 911 and 916, digital-to-analog converters 912 and 913 and a strong arm latch circuit 919. Expected values Vref+ and Vref− correspond to the expected value DE in FIG. 8A. The digital-to-analog converters 912 and 913 respectively subject the expected values Vref+ and Vref− to digital-to-analog conversion. A test pattern TP of "10101..." is input to an input terminal IN. The switch 901 is turned on at the start of amplitude detection and is turned off after a connection of the capacitance connection switches 802 of FIG. 8A and after amplitude detection. The switch 904, in synchronization with a clock signal CK0, samples the low level data "0" of the test pattern TP and charges the capacitance 906. The switch 903, in synchronization with a clock signal CK1, samples the high level data "1" of the test pattern TP and charges the capacitance 905. The amplitude of high level data at a node 917 is controlled by the expected value Vref+. The amplitude of low level data at a node 918 is controlled by the expected value Vref−. The strong arm latch circuit 919 latches signals of the nodes 917 and 918 and outputs latched differential signals OUT and OUTX. The amplitude monitor circuit 803 may detect whether the amplitudes of the low level data and the high level data are larger than the desired expected values.

Figure 10:
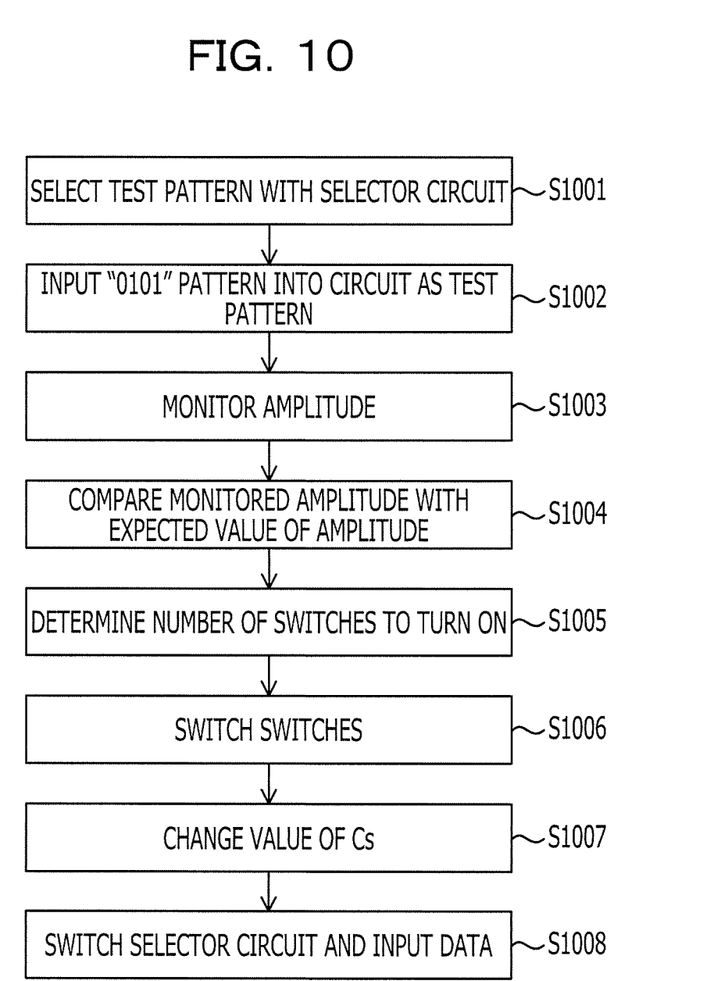
FIG. 10 illustrates an exemplary operation of a transmission system.

FIG. 10 illustrates an exemplary operation of a transmission system. The operations illustrated in FIG. 10 may be the operations of the transmission system illustrated in FIG. 8A. In an operation S1001, the selector circuit 801 selects a test pattern TP in a test mode. In an operation S1002, the inverter 201 receives a test pattern TP of "0101...". In an operation S1003, the amplitude monitor circuit 803 monitors the amplitude of the voltage of the output terminal 804 of the transmitter 102. In an operation S1004, the amplitude monitor circuit 803 compares the monitored voltage amplitude and the amplitude expected value DE. In an operation S1005, the amplitude monitor circuit 803 determines the number of turning on of switches 802 in accordance with the result of the comparison. In an operation S1006, the amplitude monitor circuit 803 switches the connections of the switches 802 in accordance with the result of determination. In an operation S1007, the values of the capacitances Cs are changed in accordance with the switching of the switches. In an operation S1008, the selector circuit 801 selects an input data signal d(n) in a normal mode. The inverter 201 receives the input data signal d(n) and the input data signal d(n) is transmitted. The amplitude of the output signal of the transmitter 102 is controlled to a desired amplitude and power consumption may be reduced.

Figure 11:
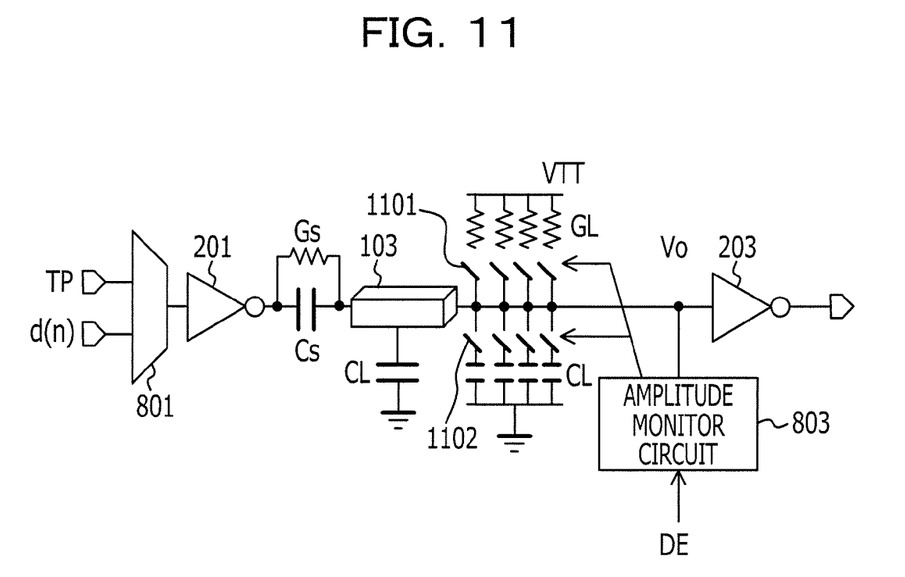
FIG. 11 illustrates an exemplary circuit of a transmission system.

FIG. 11 illustrates an exemplary circuit of a transmission system. An amplitude monitor circuit 803 may be provided inside a receiver 104. One or multiple series circuits, in which a resistance of a conductance GL and a switch 1101 are coupled in series, are coupled in parallel between a power supply potential node VTT and an inverter 203. One or multiple series circuits, in which a capacitance CL and a switch 1102 are coupled in series, are coupled in parallel between an input terminal of the inverter 203 and a ground potential node. A selector circuit 801, as illustrated in FIG. 8A, selects and outputs a test pattern TP or an input data signal d(n) to the inverter 201. The amplitude monitor circuit 803, as illustrated in FIG. 8A, detects the amplitude of an input voltage Vo of the receiver 104 and controls the switches 1101 and/or the switches 1102 so that the amplitude of the input voltage Vo becomes an expected value DE. The switches 1101 are controlled and therefore the values of the conductances GL between the input terminal of the inverter 203 and the power supply potential node VTT may change. The switches 1102 are controlled and therefore the values of the capacitances CL between the input terminal of the inverter 203 and the ground potential node may change. Consequently, the amplitude of the input voltage Vo of the receiver 104 may change. The amplitude monitor circuit 803 detects the amplitude of the input voltage Vo of the receiver 104 and controls the values of the input capacitances CL and/or the values of the second resistances of the conductances GL of the receiver 104 in accordance with the detected amplitude of the input voltage Vo. The amplitude of the input voltage Vo of the receiver 104 may be controlled to a desired expected value DE. Other components and functions in FIG. 11 may be substantially the same as or similar to those illustrated in FIG. 7.

For example, when the capacitances CL or the conductances GL are affected by process variations, frequency characteristic caused by transmission from the transmitter 102 to the receiver 104 may not be flat. The amplitude monitor circuit 803 adjusts the capacitances CL and the conductances GL by controlling the switches 1101 and 1102 based on the test pattern TP. Accordingly, the frequency characteristic may be flattened.

For example, the amplitude monitor circuit 803 illustrated in FIG. 8A may be provided. The amplitude monitor circuit 803 may detect the amplitude of an input voltage Vo of the receiver 104 and control the value of the input capacitance CL of the receiver 104 in accordance with the detected amplitude of the input voltage Vo.

Figure 12:
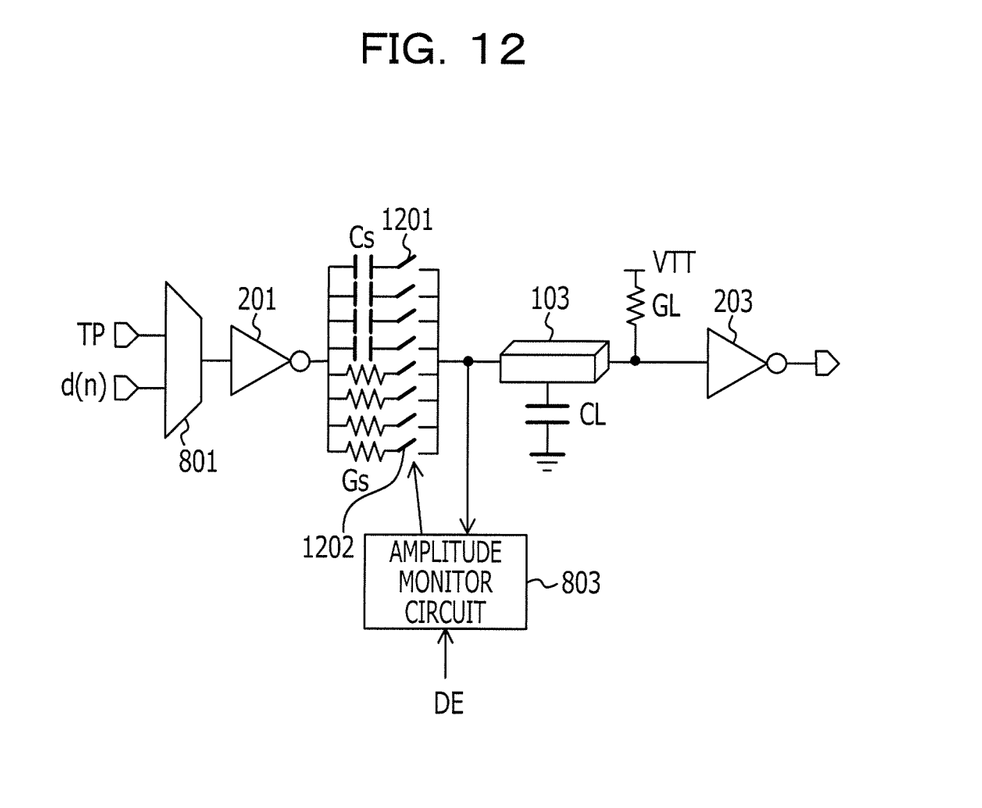
FIG. 12 illustrates an exemplary circuit of a transmission system.

FIG. 12 illustrates an exemplary circuit of a transmission system. An amplitude monitor circuit 803 may be provided inside a transmitter 102. One or multiple series circuits, in which a resistance of conductance Gs and a switch 1202 are coupled in series, are coupled in parallel between an output terminal of an inverter 201 and a transmission channel 103. One or multiple circuits, in which a capacitance Cs and a switch 1201 are coupled in series, are coupled in parallel between an output terminal of the inverter 201 and the transmission channel 103. A selector circuit 801, as illustrated in FIG. 8A, selects and outputs a test pattern TP or an input data signal d(n) to the inverter 201. An amplitude monitor circuit 803, as illustrated in FIG. 8A, detects the amplitude of an output voltage of the transmitter 102 and controls the switches 1201 and/or 1202 so that the detected amplitude of the output voltage becomes an expected value DE. The values of the capacitances Cs between the output terminal of the inverter 201 and the transmission channel 103 may change due to control of the switches 1201. The values of the conductances Gs between the output terminal of the inverter 201 and the transmission channel 103 may change due to control of the switches 1202. Consequently, the amplitude of the output voltage of the transmitter 102 may change. The amplitude monitor circuit 803 detects the amplitude of the output voltage of the transmitter 102 and controls the values of the first capacitances Cs and/or the values of the first resistances of conductances Gs in accordance with the detected amplitude of the output voltage. Consequently, the amplitude of the output voltage of the transmitter 102 may be controlled to a desired expected value DE. Other components and functions in FIG. 12 may be substantially the same as or similar to those illustrated in FIG. 7.

Figure 13A:
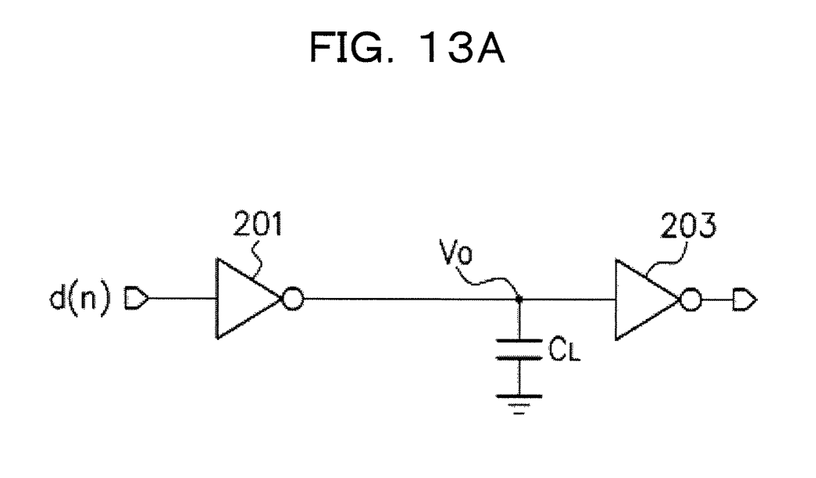
FIG. 13A illustrates an exemplary circuit of a transmission system.
Figure 13B:
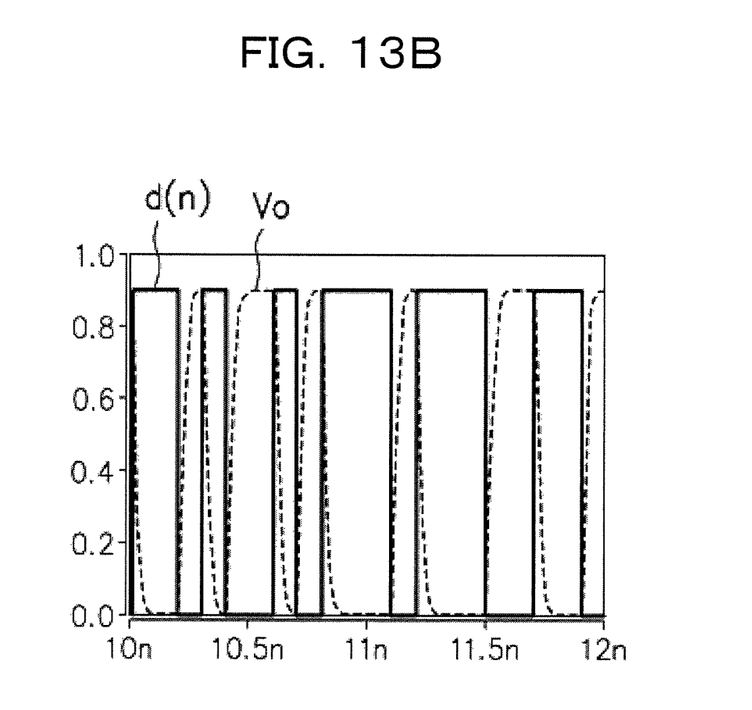
FIG. 13B illustrates an exemplary simulation result.

FIG. 13A illustrates an exemplary circuit of a transmission system. FIG. 13B illustrates an exemplary simulation result. The simulation result illustrated in FIG. 13B may be a simulation result of the transmission system illustrated in FIG. 13A. An inverter 201 outputs a signal that is the logical inverse of an input data signal d(n). A voltage Vo may be the voltage of the output terminal of the inverter 201. An inverter 203 outputs a signal that is the logical inverse of the output voltage Vo of the inverter 201. A capacitance CL is the capacitance between the input terminal of the inverter 203 and the ground potential node. The amplitudes of the input data signal d(n) and the voltage Vo are substantially the same and for example may be 0.9 V. The current consumed by the transmission system may be 1.4 mA.

Figure 14A:
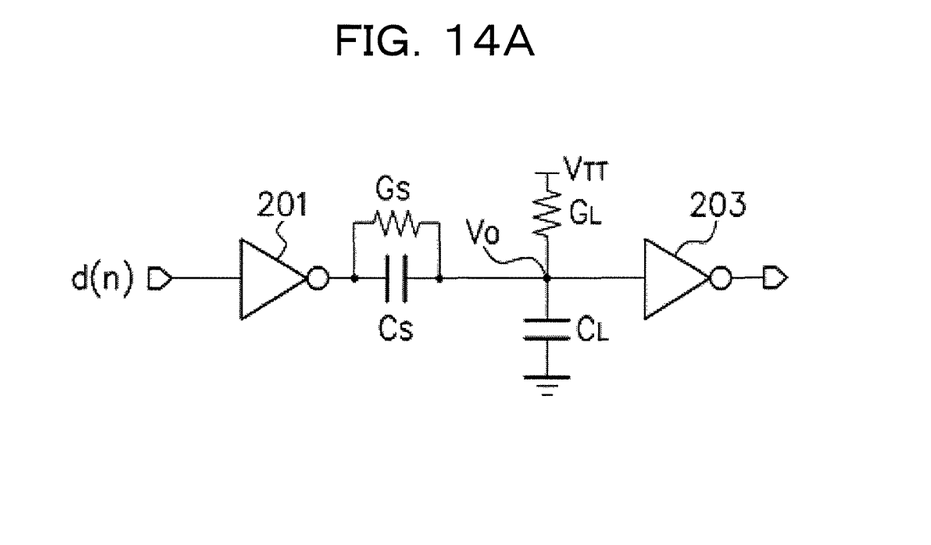
FIG. 14A illustrates an exemplary circuit of a transmission system.
Figure 14B:
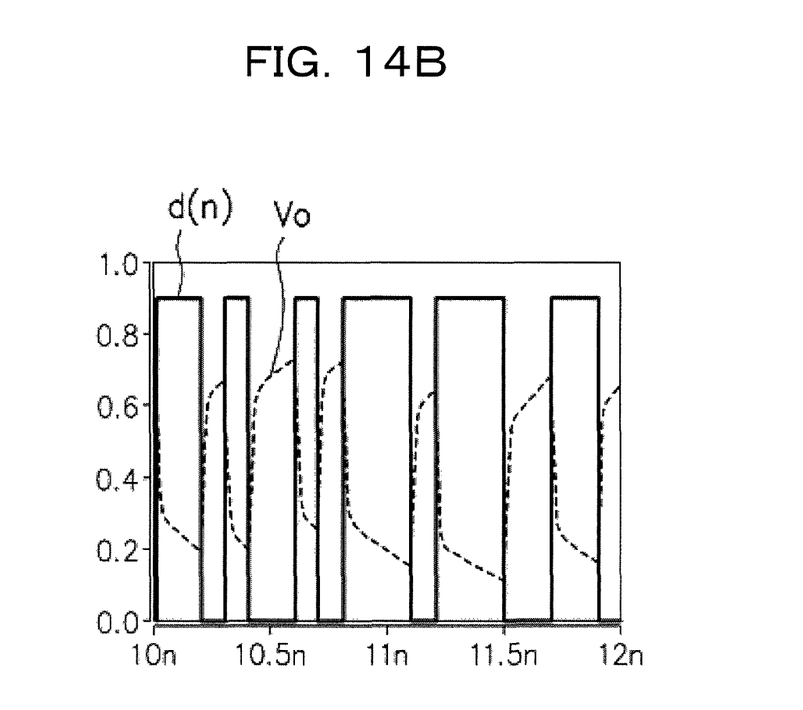
FIG. 14B illustrates an exemplary simulation result.

FIG. 14A illustrates an exemplary circuit of a transmission system. FIG. 14B illustrates an exemplary simulation result. The transmission system illustrated in FIG. 14A may be the transmission system illustrated in FIG. 7. The simulation result illustrated in FIG. 14B may be a simulation result of the transmission system illustrated in FIG. 14A. The amplitude of the voltage Vo is smaller than the amplitude of the input data signal d(n). The current consumed by the transmission system may be 1 mA. The current consumed by the transmission system illustrated in FIG. 13A (1.4 mA) may be reduced to 5/7 of the original value and power consumption may be reduced.

In the above-described transmission systems, a data signal having a small amplitude is transmitted from the transmitter 102 to the receiver 104 via the transmission channel 103 and as a result power consumption may be reduced. In the transmission systems, power is consumed at the time of transit of data. Consequently, in the case where there are identical adjacent bits such as "00" or "11" as the pattern of the input data signal d(n), power consumption may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission system comprising:
   a transmitter configured to transmit a first signal signal so that a receiver coupled to the transmitter via a transmission channel receives a second signal, the receiver including
   a bias circuit configured to regulate a direct current bias level of an input terminal of the receiver,
   wherein the transmitter includes a first amplitude converter configured to convert the first signal to the second signal having a smaller amplitude than an amplitude of the first signal, wherein the receiver includes a second amplitude converter configured to convert the second signal to a third signal having a larger amplitude than the amplitude of the second signal, and
   wherein the first amplitude converter includes a first capacitor that restricts an amount of charge to be supplied to the receiver, one end of the first capacitor being coupled to an output terminal of the transmitter which is coupled to the transmission channel and the other end of the first capacitor being coupled to a potential node.

2. The transmission system according to claim 1, wherein the reciever includes an equalizer configured to remove intersymbol interference caused by transmission from the transmitter to the receiver.

3. A transmission system comprising:
   a transmitter configured to transmit a first signal so that a receiver coupled to the transmitter via a transmission channel receives a second signal, the receiver including
   a bias circuit configured to regulate a direct current bias level of an input terminal of the receiver,
   wherein the transmitter includes a first amplitude converter configured to convert the first signal to the second signal having a smaller amplitude than an amplitude of the first signal, wherein the receiver includes a second amplitude converter configured to convert the second signal to a third signal having a larger amplitude than the amplitude of the second signal, and
   wherein the first amplitude converter includes a first capacitor that restricts an amount of charge to be supplied to the receiver,
   wherein the bias circuit includes:
   a first resistance coupled in parallel with the first capacitor; and
   a second resistance coupled between the input terminal of the receiver and a power supply potential node.

4. The transmission system according to claim 1, further comprising,
   a first amplitude monitor circuit configured to detect an amplitude of an output voltage of the transmitter and control a value of the first capacitor in accordance with the amplitude of the output voltage.

5. The transmission system according to claim 1, wherein the receiver includes a second amplitude monitor circuit configured to detect an amplitude of an input voltage of the receiver and control a value of an input capacitor of the receiver in accordance with the amplitude of the input voltage.

6. The transmission system according to claim 3, wherein the receiver includes a second amplitude monitor circuit configured to detect an amplitude of an input voltage of the receiver and control a value of an input capacitor of the receiver or a value of the second resistance in accordance with the amplitude of the input voltage.

7. The transmission system according to claim 3, further comprising, a first amplitude monitor circuit configured to detect an amplitude of an output voltage of the transmitter and control a value of the first capacitor or a value of the first resistance in accordance with the amplitude of the output voltage.

8. A transmission system comprising:
   a transmitter configured to transmit a first signal so that a receiver coupled to the transmitter via a transmission channel receives a second signal, the receiver including
   a bias circuit configured to regulate a direct current bias level of an input terminal of the receiver,
   wherein the transmitter includes a first amplitude converter configured to convert the first signal to the second signal having a smaller amplitude than an amplitude of the first signal, wherein the receiver includes a second amplitude converter configured to convert the second signal to a third signal having a larger amplitude than the amplitude of the second signal, and
   wherein the first amplitude converter includes a first capacitor that restricts an amount of charge to be supplied to the receiver,
   wherein one end of the first capacitor is coupled to an input terminal of the transmitter and the other end of the first capacitor is coupled to an output terminal of the transmitter.

9. The transmission system according to claim 1, wherein the potential node is a power supply potential node or a ground potential node.

10. The transmission system according to claim 1, wherein the transmitter receives a pattern and controls a value of the first capacitor in accordance with an amplitude of the pattern.

11. The transmission system according to claim 1, wherein the bias circuit includes:
    a first resistance coupled in parallel with the first capacitor; and
    a second resistance coupled between the input terminal of the receiver and a power supply potential node.

12. The transmission system according to claim 8, wherein the bias circuit includes:
    a first resistance coupled in parallel with the first capacitor; and
    a second resistance coupled between the input terminal of the receiver and a power supply potential node.

* * * * *